United States Patent [19]

Bose et al.

[11] Patent Number: 4,650,725

[45] Date of Patent: * Mar. 17, 1987

[54] HOMOGENEOUS, DUCTILE COBALT BASED HARDFACING FOILS

[75] Inventors: Debasis Bose, Randolph; Amitava Datta, Mendham; Nicholas J. DeCristofaro, Chatham, all of N.J.; Claude Henschel, Redwood City, Calif.

[73] Assignee: Allied Corporation, Morris Township, Morris County, N.J.

[*] Notice: The portion of the term of this patent subsequent to May 7, 2002 has been disclaimed.

[21] Appl. No.: 703,018

[22] Filed: Feb. 19, 1985

Related U.S. Application Data

[60] Division of Ser. No. 515,679, Jul. 21, 1983, Pat. No. 4,515,868, which is a continuation of Ser. No. 285,882, Jul. 22, 1981, abandoned.

[51] Int. Cl.$^4$ .............................................. B32B 15/01
[52] U.S. Cl. ................................... 428/668; 428/606; 428/679
[58] Field of Search ....................... 428/606, 668, 679; 148/403; 420/435, 436, 440, 581, 583, 584, 585, 588

[56] References Cited

U.S. PATENT DOCUMENTS

| 4,236,946 | 12/1980 | Aboaf et al. | 148/403 |
| 4,260,666 | 4/1981 | DeCristofaro et al. | 428/606 |
| 4,482,400 | 11/1984 | O'Handley | 148/403 |

*Primary Examiner*—L. Dewayne Rutledge
*Assistant Examiner*—Robert L. McDowell
*Attorney, Agent, or Firm*—Ernest D. Buff; Gerhard H. Fuchs

[57] ABSTRACT

Hardfacing of metal parts employing a thin, homogeneous, ductile foil is disclosed. The hardfacing foil has a composition consisting essentially of 0 to about 32 atom percent nickel, 0 to about 10 atom percent iron, 0 to about 30 atom percent chromium, 0 to about 2 atom percent tungsten, 0 to about 4 atom percent molybdenum, about 5 to about 25 atom percent boron, 0 to about 15 atom percent silicon and 0 to about 2 atom percent manganese and 0 to 5 atom percent carbon the balance being cobalt and incidental impurities with the proviso that the total of iron, cobalt, nickel, chromium, tungsten and molybdenum ranges from about 70 to 88 atom percent and the total of boron, silicon and carbon ranges from about 12 to 30 atom percent. The ductile foil permits continuous hardfacing of soft matrix, like low carbon and low alloy steels, imparting superior resistance to wear and corrosion.

3 Claims, No Drawings

HOMOGENEOUS, DUCTILE COBALT BASED HARDFACING FOILS

This application is a division of application Ser. No. 515,679, filed July 21, 1983, now U.S. Pat. No. 4,515,868, which, in turn, is a continuation of Ser. No. 285,882, filed July 22, 1981, now abandoned.

BACKGROUND OF THE INVENTION

1. Field of the Invention

This invention relates to hardfacing of metal parts and, in particular, to a homogeneous, ductile material useful in hardfacing applications.

Hardfacing is a method of depositing a wear and corrosion resistant layer by melting suitable alloys in-situ. Only the surface of the base metal being hardfaced is brought to the melting point and the hardfacing rod, wire, or powder is melted and spread over the surface of the base metal.

Hardfacing is a fast, economical process used to repair or rebuild worn parts, thereby reducing the overall cost of operation and down time. The process can be used to build composite parts, combining hardness, toughness and corrosion resistance at low cost. Suitable wear and corrosion resistant surface layers can be imparted to parts e.g. dies and forming tools, which are made of cheaper, shock resistant alloys such as plain carbon or low alloy steels. Moreover, hardfacing is employed in structures wherein a soft core is used to overcome str sses and a hard casing is used to resist wear. Examples of such structures include injection and extrusion screws utilized in plastics processing and the like. Many parts, which would otherwise be scrapped, are put back into service for less than their original cost. An additional saving is realized because the parts can be rebuilt in-situ when necessary.

Conventional hardfacing processes include: oxy-acetylene, tungsten inert gas welding (TIG), metal inert gas welding (MIG), submerged arc weld deposition, plasma transferred arc welding and the like. Hardfacing alloys used in such processes contain a substantial amount (about 1 to 11 weight percent) of metalloid elements such as boron, silicon or carbon. Consequently, such alloys are very brittle and are available only in rod form or as powder.

One of the most troublesome problems with conventional hardfacing methods and materials is the difficulty of controlling the thickness and uniformity of the surface layer. The rigid rod-like structures used to advance hardfacing material to the heating zone cannot be economically adapted to continuous surfacing processes. Hardfacing rods are usually applied manually by tungsten inert gas or oxy-acetylene processes which are non-continuous and inherently slow. Continuous hardfacing has been achieved by automatic tungsten inert gas machines in which individual rods are fed by gravity, or by plasma transferred arc (PTA) welding procedures wherein powdered surfacing material is fed to the heating zone. Such procedures require materials and equipment that are relatively expensive. Moreover, the excessive heat generated by the plasma in PTA welding processes adversely affects flowability characteristics of the hardfacing alloy and dilutes the alloy with material from the base metal, changing the compositional uniformity of the surface layer. As a result, there remains a need in the art for an economical continuous hardfacing process.

Ductile glassy metal alloys have been disclosed in U.S. Pat. No. 3,856,513, issued Dec. 24, 1974 to H.S. Chen et al. These alloys include compositions having the formula $M_a Y_b Z_c$, where M is a metal selected from the group consisting of iron, nickel, cobalt, vanadium and chromium, Y is an element selected from the group consisting of phosphorus, boron and carbon, and Z is an element selected from the group consisting of aluminum, silicon, tin, germanium, indium, antimony and beryllium, "a" ranges from about 60 to 90 atom percent, "b" ranges from about 10 to 30 atom percent and "c" ranges from about 0.1 to 15 atom percent. Also disclosed are glassy wires having the formula $T_i X_j$, where T is at least one transition metal and X is an element selected from the group consisting of phosphorus, boron, carbon, aluminum, silicon, tin, germanium, indium, beryllium and antimony, "i" ranges from about 70 to 87 percent and "j" ranges from about 13 to 30 atom percent. Such materials are conveniently prepared by rapid quenching from the melt using processing techniques that are now well-known in the art. No hardfacing compositions are disclosed therein, however.

There remains a need in the art for a homogeneous, hardfacing material that is available in thin, ductile filamentary form.

SUMMARY OF THE INVENTION

In accordance with the invention, there is provided a homogeneous, ductile hardfacing filament useful as a filler metal for a hardfaced metal article. The hardfacing filament is composed of metastable material having at least 50 percent glassy structure, and has a thickness not greater than 0.004 inch ($10.16 \times 10^3$ cm,) and in particular a thickness in the range of 0.0005 to 0.004 inch ($27 \times 10^{-3}$ cm to $10.16 \times 10^{-3}$ cm). It has been found that use of hardfacing filament that is flexible, thin, and homogeneous, as described above, has the potential of enhancing the speed of hardfacing and enhances the hardness of the deposited surface layer.

More specifically, the hardfacing filament has a thickness of about 0.0005 to 0.004 inch (1.27 cm$\times 10^{-3}$ to $10.16 \times 10^{-3}$ cm). Preferably, such filament has a composition consisting essentially of 0 to about 32 atom percent nickel, 0 to about 10 atom percent iron, 0 to about 30 atom percent chromium, 0 to about 2 atom percent manganese, 0 to 5 atom percent carbon, and the balance essentially cobalt and incidental impurities, with the proviso that the total of iron, cobalt, nickel, chromium, tungsten and molybdenum ranges from about 70 to 88 atom percent and the total of boron, silicon and carbon ranges from about 12 to 30 atom percent.

The homogeneous hardfacing filament of the invention is fabricated by a process which comprises forming a melt of the composition and quenching the melt on a rotating quench wheel at a rate of at least about $10^{5°}$ C./sec.

The filler metal filament is easily fabricable as, homogeneous, ductile ribbon, which is useful for hardfacing. Further, the homogeneous, ductile hardfacing filament of the invention can reduce the deposit thickness resulting in less dilution from the substrate and less cost in grinding of the deposited layer.

The invention will be more fully understood and further advantages will become apparent when reference is made to the following detailed description of the preferred embodiments of the invention.

DETAILED DESCRIPTION OF THE INVENTION

In accordance with the invention a homogeneous ductile hardfacing filamentory material in foil form is provided. The hardfacing foil is less than 0.004 inch ($10.16 \times 10^{-3}$ cm) thick, preferably about 0.004 to 0.002 inch ($10.16 \times 10^{-3}$ to $5.08 \times 10^{-3}$ cm) thick and has a composition consisting essentially of 0 to about 32 atom percent nickel, 0 to about 10 atom percent iron, 0 to about 30 atom percent chromium, 0 to about 2 atom percent tungsten, 0 to about 4 atom percent molybdenum, about 2 to about 25 atom percent boron, 0 to about 15 atom percent silicon and 0 to about 2 atom percent manganese and 0 to 5 atom percent carbon, the balance being cobalt and incidental impurities with proviso that the total of iron, cobalt, nickel, chromium, tungsten and molybdenum ranges from about 70 to 88 atom percent and the total of boron, silicon and carbon ranges from about 12 to 30 atom percent.

These compositions are suitable for hardfacing low carbon and low alloy steels with greater resistance to wear and corrosion.

By homogeneous is meant that the foil, as produced, is of substantially uniform composition in all dimensions. By ductile is meant that the foil can be bent to a round radius as small as ten times the foil thickness without fracture.

Examples of hardfacing alloy compositions within, the scope of present invention are set forth in Table I below.

alloys must be at least 80% glassy, an most preferably substantially (or totally) glassy, to attain superior ductility.

The metastable phase may also be a solid solution of the constituent elements. In the case of the alloys of the invention, such metastable, solid solution phases are not ordinarily produced under conventional processing techniques employed in the art of fabricatin crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above Hardfacing of metal substrates is readily accomplished in accordance with the invention by feedin a continuous filament from a spool or other similar wound supply source to a heating zone. The filament so fed is homogeneous and ductile, composed of metastable material having at least 50 percent glassy structure an has a composition consisting essentially of 0 to about 32 atom percent nickel, 0 to about 10 atom percent iron 0 to about 30 atom percent chromium, 0 to about 2 atom percent tungsten, 0 to about 4 atom percent molybdenum, about 2 to about 25 atom percent boron, 0 to about 15 atom percent silicon and 0 to about 2 atom percent manganese, 0 to 5 atom percent carbon, the balance being cobalt plus incidental impurities with the proviso that the total of iron, cobalt, nickel, chromium, tungsten and molybdenum ranges from about 70 to 88 atom percent and the total of boron, silicon and carbon ranges

TABLE I

| | | Co | Cr | Ni | Fe | B | Si | Mo | Mn | W | C |
|---|---|---|---|---|---|---|---|---|---|---|---|
| Co—Ni—Fe—B—Si | at % | 39.4 | — | 30.9 | 6.9 | 9.8 | 13 | — | — | — | — |
| | wt % | 46.5 | — | 36.3 | 7.8 | 2.1 | 7.2 | — | — | — | — |
| Co—Fe—B—Si | at % | 70.3 | — | — | 5.7 | 8 | 16 | — | — | — | — |
| | wt % | 82.9 | — | — | 6.4 | 1.7 | 9 | — | — | — | — |
| Co—Ni—Fe—B—Si—Mo | at % | 43.8 | — | 21.9 | 7.3 | 13.0 | 12.0 | 2.0 | — | — | — |
| | wt % | 52.2 | — | 26.0 | 8.3 | 2.8 | 6.8 | 3.9 | — | — | — |
| Co—Fe—B—Si—Mo | at % | 65.2 | — | — | 5.3 | 12.5 | 13.0 | 4.0 | — | — | — |
| | wt % | 76.5 | — | — | 5.9 | 2.7 | 7.3 | 7.6 | — | — | — |
| Co—Cr—Fe—Ni—B—Si—Mn—W—C | at % | 48.4 | 26.3 | 2.5 | 2.6 | 11.7 | 1.7 | — | 1.3 | 1.0 | 4.5 |
| | wt % | 55.8 | 28.0 | 3.0 | 3.0 | 2.6 | 1.0 | — | 1.5 | 4.0 | 1.1 |
| Co—Cr—B—Si—W | at % | 62.9 | 21.2 | — | — | 11.6 | 3.0 | — | — | 1.3 | — |
| | wt % | 70.5 | 21.0 | — | — | 2.4 | 1.6 | — | — | 4.5 | — |

The hardfacing foils of the invention are prepared by cooling a melt of the desired composition at a rate of at least about $10^5$ C./sec, employing metal alloy quenching techniques well-known to the glassy metal alloy art; see, e.g., U.S. Pat. Nos. 3,856,513 and 4,148,973. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes from ribbons of the alloys. Preferably, the glassy metal from about 12 to 30 atom percent. Heat is applied to the filament within the heating zone to melt the filament and cause it to become deposited on a work surface in close proximity thereto. The work surface is then permitted to cool, causing the deposited filament to form a hard, adherent coating thereon.

Use of the hardfacing process of the present invention affords significant advantages. A thin (0.002"), dense coating can be deposited on the metal substrate. Oxide content in the coating is lower than that generally produced by flame spraying operations. A superior bond between the coating and the substrate is attained by the diffusion of metalloid elements from the coating into the substrate. Hardfacing can be carried out in a furnace or with a torch, with the result that the need for specialized equipment is eliminated.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLES

Example 1

Ribbons about 2.5 to 25.4 mm (about 0.10 to 1.00 inch) wide and about 13 to 60 m (about 0.0005 to 0.0025 inch) thick were formed by squirting a melt of the particular composition by overpressure of argon onto a rapidly rotating copper chill wheel (surface speed about 3000 to 6000 ft/min or 914.4 to 1828.8 m/min). Metastable, homogeneous ribbons of substantially glassy alloys having the following compositions in weight percent and atom percent were produced. The compositions of the ribbons are set forth in Table II below.

TABLE II

|  |  | Co | Cr | Ni | Fe | B | Si | Mo | Mn | W | C |
|---|---|---|---|---|---|---|---|---|---|---|---|
| Co—Ni—Fe—B—Si | at % | 39.4 | — | 30.9 | 6.9 | 9.8 | 13 | — | — | — | — |
|  | wt % | 46.5 | — | 36.3 | 7.8 | 2.1 | 7.2 | — | — | — | — |
| Co—Fe—B—Si | at % | 70.3 | — | — | 5.7 | 8 | 16 | — | — | — | — |
|  | wt % | 82.9 | — | — | 6.4 | 1.7 | 9 | — | — | — | — |
| Co—Ni—Fe—B—Si—Mo | at % | 43.8 | — | 21.9 | 7.3 | 13.0 | 12.0 | 2.0 | — | — | — |
|  | wt % | 52.2 | — | 26.0 | 8.3 | 2.8 | 6.8 | 3.9 | — | — | — |
| Co—Fe—B—Si—Mo | at % | 65.2 | — | — | 5.3 | 12.5 | 13.0 | 4.0 | — | — | — |
|  | wt % | 76.5 | — | — | 5.9 | 2.7 | 7.3 | 7.6 | — | — | — |
| Co—Cr—Fe—Ni—B—Si—Mn—W—C | at % | 48.4 | 26.3 | 2.5 | 2.6 | 11.7 | 1.7 | — | 1.3 | 1.0 | 4.5 |
|  | wt % | 55.8 | 28.0 | 3.0 | 3.0 | 2.6 | 1.0 | — | 1.5 | 4.0 | 1.1 |
| Co—Cr—B—Si—W | at % | 62.9 | 21.2 | — | — | 11.6 | 3.0 | — | — | 1.3 | — |
|  | wt % | 70.5 | 21.0 | — | — | 2.4 | 1.6 | — | — | 4.5 | — |

Ribbons of different alloy compositions were used to develop a hardfacing layer in accordance with the following procedure. The ribbon thickness varied from 0.001″–0.0025″ ($2.54 \times 10^{-3}$ to $6.35 \times 10^{-3}$ cm). The ribbons were positioned relative to AISI 304 stainless steel sheets (about 0.0625″ [$1.59 \times 10^{-1}$ cm] thick) and the composites were heated separately to a temperature of 1900°–2300° F. (1038°–1260° C.) varying from alloy to alloy in a vacuum furnace to about 15 minutes. The samples were then removed from the furnace, sectioned, mounted, and polished for microhardness measurement of the hardfaced layer.

The composition and Knoop hardness values (100 gms load, 15 sec. indentation time) of each ribbon alloy tested are set forth in Table III.

TABLE III

| Sample No. | Composition (at %) | $KHN_{100}$ |
|---|---|---|
| 1 | $Co_{39.4}Ni_{30.9}Fe_{6.9}B_{9.8}Si_{13}$ | 133 |
| 2 | $Co_{70.3}Fe_{5.7}B_8Si_{16}$ | 257 |
| 3 | $Co_{43.8}Ni_{21.9}Fe_{7.3}B_{13}Si_{12}Mo_2$ | 222 |

TABLE III-continued

| Sample No. | Composition (at %) | $KHN_{100}$ |
|---|---|---|
| 4 | $Co_{65.2}Fe_{5.3}B_{12.5}Si_{13}Mo_4$ | 240 |
| 5 | $Co_{48.4}Cr_{26.3}Ni_{2.5}Fe_{2.6}B_{11.7}Si_{1.7}Mo_{1.3}W_{1.0}C_{4.5}$ | 186 |

Having thus described the invention in rather full detail it will be understood that these details need not be strictly adhered to but that various changes and modifications may suggest themselves to one skilled in the art, all falling within the scope of the present invention as defined by the subjoined claims.

What is claimed is:

1. A surface layer hardfaced on a metal article by feeding to a heating zone a homogeneous, ductile hardfacing foil composed of metastable material having at least 50 percent glassy structure and a composition consisting essentially of 0 to about 30.9 atom percent nickel, 0 to about 7.3 atom percent iron, 0 to about 26.3 atom percent chromium, 0 to about 1.3 atom percent tungsten, 0 to about 4 atom percent molybdenum, about 8 to about 13 atom percent boron, 1.7 to about 13 atom percent silicon, 0 to about 1.3 atom percent manganese, and 0 to 4.5 atom percent carbon and 39.4 to 70.3 atom percent cobalt and incidental impurities with the proviso that the total iron, cobalt, nickel, chromium, tungsten and molybdenum ranges from about 70 to 88 atom percent and the total of boron, silicon and carbon ranges from about 12 to 30 atom percent; applying heat to said foil within said heating zone to melt said foil and cause it to become deposited on a portion of said article in close proximity thereto; and cooling said portion to cause said deposited foil to form a hard, adherent coating thereon.

2. A surface layer as recited in claim 1, wherein said material is at least 80 percent glassy.

3. A surface layer as recited in claim 1, wherein said material is at 100 percent glassy.

* * * * *